United States Patent [19]

Fushiya et al.

[11] Patent Number: 4,638,700
[45] Date of Patent: Jan. 27, 1987

[54] PORTABLE MITER SAWS

[75] Inventors: Fusao Fushiya; Nobuo Hakamata; Hiroyuki Abe; Nobuhiro Inoue, all of Anjo, Japan

[73] Assignee: Makita Electric Works, Ltd., Anjo, Japan

[21] Appl. No.: 837,820

[22] Filed: Mar. 10, 1986

[30] Foreign Application Priority Data

Jun. 12, 1985 [JP] Japan .................................. 60-127838

[51] Int. Cl.⁴ ............................................... B27B 5/24
[52] U.S. Cl. .................................. 83/467 R; 83/471.3; 83/490; 83/581
[58] Field of Search ..................... 83/581, 471.2, 471.3, 83/477, 477.2, 490, 468, 467 R, 490

[56] References Cited

U.S. PATENT DOCUMENTS

| 4,002,094 | 1/1977 | Erickson et al. | 83/471.3 |
| 4,211,134 | 7/1980 | Thorsell et al. | 83/471.3 |
| 4,452,117 | 6/1984 | Brickner et al. | 83/467 R |

Primary Examiner—Frank T. Yost
Attorney, Agent, or Firm—Dennison, Meserole, Pollack & Scheiner

[57] ABSTRACT

A portable miter saw for cross-cutting and mitering elongated workpiece has a mechanism interlocked with the turntable for shutting the saw blade clearance gap in the guide fence. The mechanism is provided with a pair of shutter plates slidable on the guide fence and an interlocking piece connected to the shutter plates and movable in operative association with the turntable so as to linearly displace the shutter plates upon rotation of the turntable to selectively change the cutting angle of the saw blade.

7 Claims, 5 Drawing Figures

PORTABLE MITER SAWS

BACKGROUND OF THE INVENTION

1. Field of the Invention

The present invention relates to improved miter saws for cutting wood and more particularly, it relates to a shutter device in such miter saws which serves to shut the passage of chips severed from a workpiece to thereby increase the safety of cutting operation.

2. Description of Prior Art

Such miter saws may comprise a supporting frame of generally rectangular form, a work fence secured to the frame, and a circular turntable rotatably mounted on the frame and a structure secured to and movable with the turntable. The structure includes a saw blade, a blade guard and a drive motor which are bodily movable along a vertical path relative to the turntable. Thus, such saws can be selectively set for cross-cutting and mitering elongated workpiece upon angular displacement of the saw blade. Such miter saws are also commonly provided with means for shutting the saw blade clearance gap in the fence in order to avoid any possibility of chips passing through the gap into a spacing between the saw blade and the blade guard. However, as the position and the angle at which the saw blade intersects the gap varies with the working angle of the blade, the previous known means has been disadvantageously complicated in construction and especially, it has failed to effectively shut the gap in response to the variable working angle of the blade.

A review of the prior art patents revealed U.S. Pat. Nos. 4,211,134 and 4,452,117 which disclose a saw unit of the radial arm type in which a guide fence is slidably movable upon rotation of a turntable. However, these prior art arrangement, provided for radial arm saws, are complicated in construction, and as the whole guide fence is moved, it tends to jolt, resulting in inacurate cutting operation. Additionally, the arrangements have a disadvantage that the turntable tends to turn heavily.

SUMMARY OF THE INVENTION

It is, accordingly, an object of the present invention to eliminate the noted disadvantages associated with the prior art miter saws.

It is another object of the present invention to provide a novel miter saw having a shutter device which may effectively shut passage of chips and which is simple in construction.

According to the present invention, there is provided a miter saw comprising a supporting base, a horizontal turntable mounted for selective rotatable movement on the supporting base, a support arm having a lower end fixedly connected with one peripheral portion of the turntable and an upper end adapted to move along a vertical path relative to the turntable, a saw blade rotatably carried on the upper end of the support arm generally above the turntable, a guide fence mounted on the base and including a pair of work engaging surfaces longitudinally aligned across a blade clearance gap formed therebetween to provide passage of the saw blade, and a shutter operatively connected to the turntable for shutting the blade clearance gap and slidable on the guide fence upon rotation of the turntable to selectively change the cutting angle of the saw blade.

In a preferred embodiment, the shutter includes a pair of shutter plates longiudinally aligned across a blade entering opening formed therebetween so as to shut the blade clearance gap on both sides of the passage of the saw blade, and includes an interlocking piece connected to the pair of shutter plates generally below the blade entering opening and movable in operative association with the turntable so as to linearly displace the shutter plates in response to angular displacement of the saw blade.

The present invention will become more fully apparent from the claims and description as it proceeds in connection with the drawings.

BRIEF DESCRIPTION OF THE DRAWINGS

FIG. 5 is an enlarged sectional view taken along line V—V in FIG. 4.

DETAILED DESCRIPTION OF A PREFERRED EMBODIMENT

Figure 1:
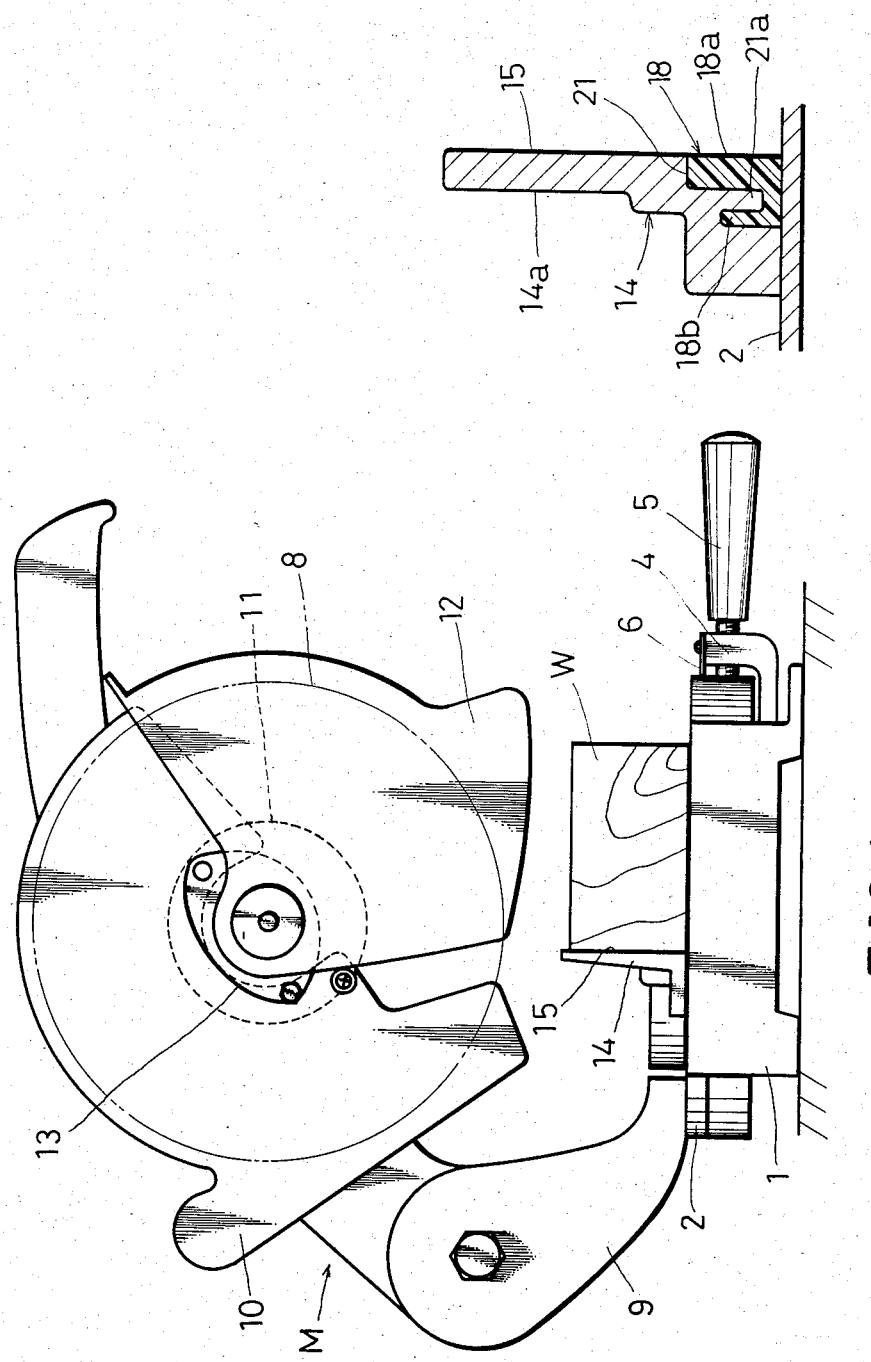
FIG. 1 is a side view of a miter saw embodying the invention.

Referring to the drawings in general, shown therein is a portable miter saw M embodying the principles of the present invention. As shown therein, the miter saw M includes a supporting base 1 of generally rectangular configuration having a circularly recessed portion 1a formed centrally therein for mounting a disc-shaped turntable 2.

The turntable 2 is horizontally rotatably mounted on the table mounting portion 1a of the base 1. The turntable 2 has a diametrically disposed slot 2a and an oblong guide hole 2b communicating with the slot 2a. The guide hole 2b has a width slightly greater than the slot 2a and is formed at a position eccentric from the axis of rotation of the turntable 2. A kerf board 3 made of plastic material is fitted in the slot 2a and the guide hole 2b of the turntable 2. The kerf board 3 includes a cutting channel 3a and an oblong opening 3b for receiving a shutter 17 which will be hereinafter explained.

A holder 4 is secured to the underside of the turntable 2 and extends forwardly of the base 1. The holder 4 has a hand grip 5 threadably attached to the extreme end thereof and adapted for turning the turntable 2 a desired angle at which it is secured to the base 1. The holder 4 also is provided on the upper surface of the extreme end thereof with a miter indexing plate 6 secured thereto and having a pointer 6a which cooperates with mitering indicia 7 indicated on the front upper surface of the central portion of the base 1 to show the turning angle of the turntable 2.

A saw blade 8 is supported by the turntable 2 to turn therewith. Specifically, as shown in FIG. 1, a support arm 9 is secured to one peripheral portion of the turntable 2. The support arm 9 has an upper end on which the saw blade 8 is rotatbly supported and which is normally biased upward by means of a spring (not shown). Thus, the blade 8 is movable along a vertical path relative to the turntable 2 and is resiliently returned from its lowermost position. It is to be noted that when the blade 8 is brought to its lowermost position, the lower end portion thereof is inserted into the cutting channel 3a of the kerf board 3.

The support arm 9 also supports a blade guard 10. A motor housing 11 accommodating a motor to drive the saw blade 8 for rotation is mounted on one side of the blade guard 10. A safety cover 12 is provided outside of the blade guard 10 in opposed relationship therewith and is vertically pivotably supported through a center cover 13 in relation to the blade guard 10. The safety cover 12 serves to cover the front lower portion of the blade 8 as the latter is lowered.

Figure 2:
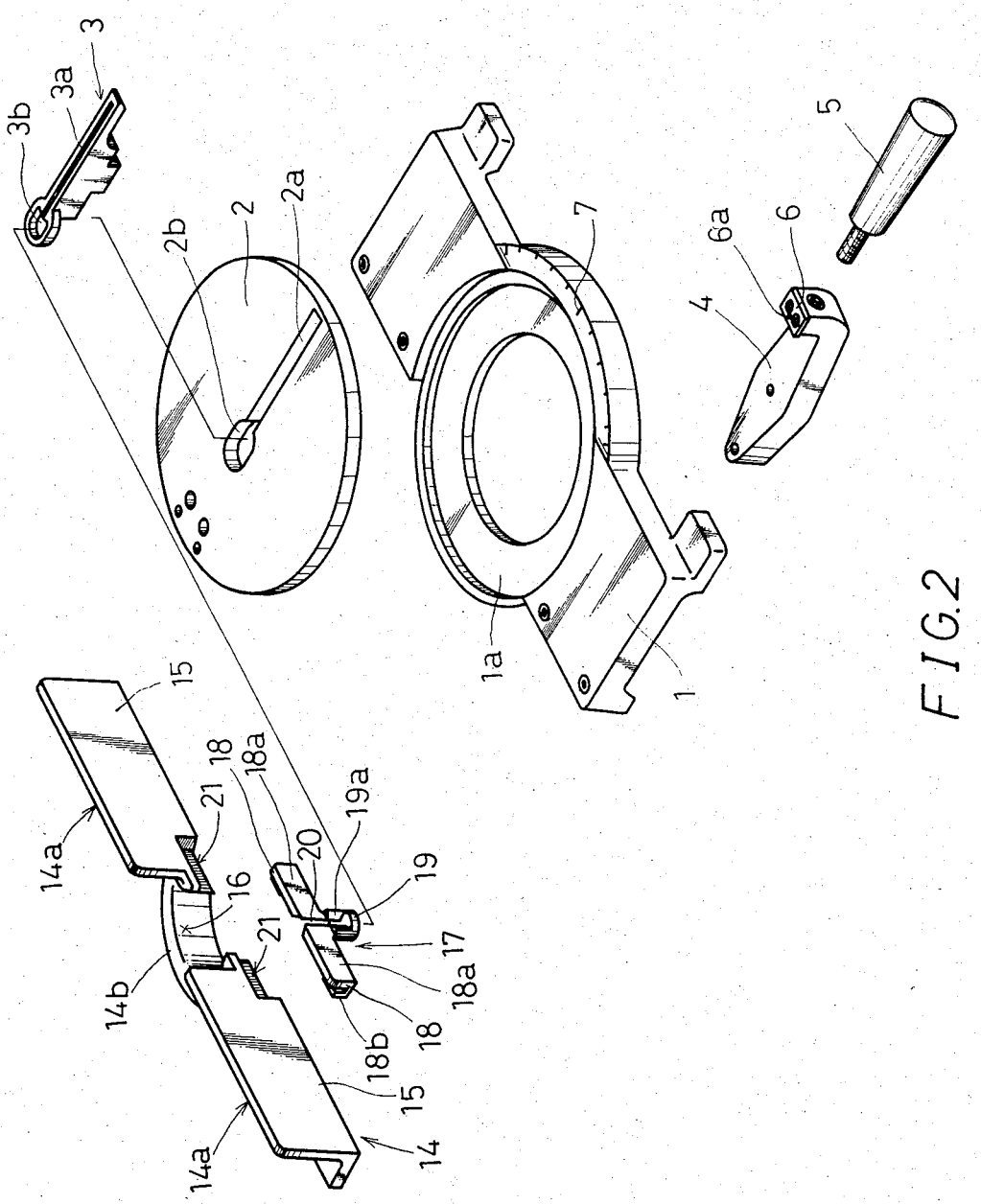
FIG. 2 is an exploded view of the essential parts of the saw shown in FIG. 1.

A guide fence 14 is mounted on the rear end of the base 1 and adapted to engage a workpiece W for its settlement on the base 1. As best shown in FIG. 2, the guide fence 14 includes a pair of guide pieces 14a aligned longitudinally and each having a vertically extending work engaging surface 15, and includes a connecting piece 14b connected to the respective inner ends of the guide pieces 14a. The guide fence 14 has a blade clearance gap 16 formed between the guide pieces 14a for providing passage of the saw blade 8 through the whole turning range of the turntable 2 (90° in this embodiment). Both of the guide pieces 14a have at the lower corners on the sides facing to the blade clearance gap 16 a pair of a shutter engaging stepped portions 21 which are longitudinally symmetrically formed, opening in the forward, inward and downward directions. As best shown in FIG. 5, each of the stepped portions 21 has on the upper surface thereof a depending piece 21a projecting therefrom.

A shutter 17 is provided to shut the lower portion of the gap 16 in the guide fence 14 and thence to prevent chips from passing through the gap 16. The shutter 17 is made of plastic material and includes a pair of shutter plates 18 aligned longitudinally with a blade entering opening 20 formed therebetween and defining the passage of the saw blade 8 as it is lowered. The shutter 17 also includes a substantially cylindrical interlocking piece 19 connected to the respective inside ends of the shutter plates 18 and projecting downwardly therefrom. The shutter plates 18 are mounted on the lower portions of the inner ends of the guide pieces 14a in such a manner as to be fitted over the shutter engaging stepped portions 21 of the guide fence 14 for horizontal sliding movement in the direction of the work engaging surfaces 15. Each of the shutter plates 18 has at the front side thereof a vertical shutter surface 18a formed in alignment with the work engaging surfaces 15 so as to provide a part of the work engaging surfaces 15. The shutter plate 18 also has in the vicinity of the outside end on the rear side thereof a locking piece 18b of substantially L-shaped cross section projecting in such a manner as to engage the depending piece 21a of the stepped portion 21.

Figure 4:
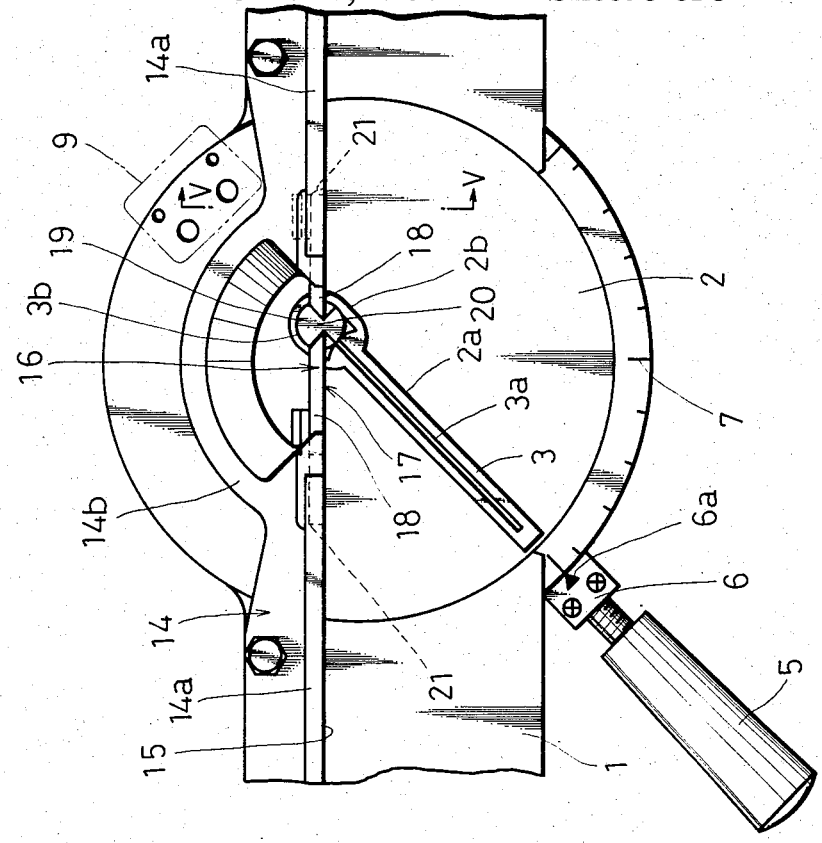
FIG. 4 is a plan view similar to FIG. 3, with the saw set for mitering position and depicting the turntable rotated to an extreme angular position relative to the guide fence.
Figure 3:
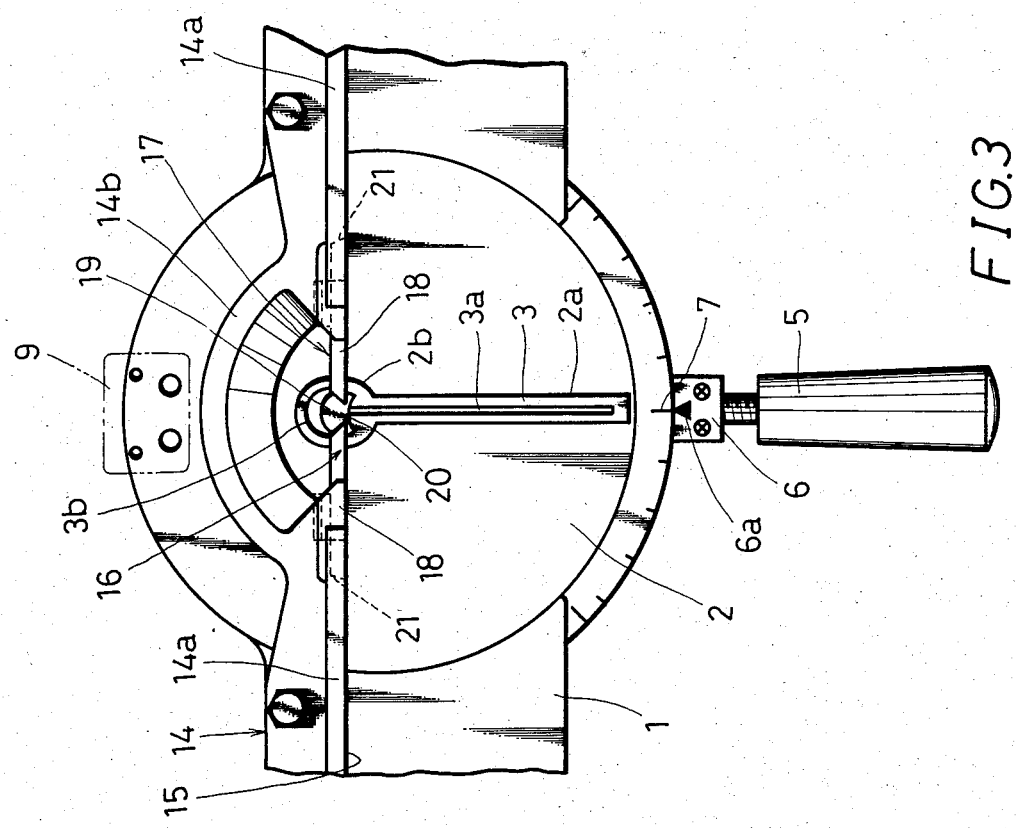
FIG. 3 is a plan view of the essential parts of the saw shown in FIG. 1, with the saw set for cross-cutting position.

The interlocking piece 19 serves to convert horizontal rotational movement of the turntable 2 into linear movement of the shutter plates 18 to horizontally move the shutter plates 18 along the work engaging surfaces 15. To this end, the interlocking piece 19 is slidably received in the oblong opening 3b of the kerf board 3 and is interlocked for displacement with the turntable 2. The interlocking piece 19 has at the upper portion thereof a recess 19a communicating with the blade entering opening 20 and providing passage of the saw blade 8. When the turntable 2 is turned as shown in FIG. 4, the interlocking piece 19 is displaced with the turntable 2, the shutter plates 18 moving along the work engaging surfaces 15. Thus, the shutter plates 18 are horizontally moved so that the blade entering opening 20 can be displaced directly below the saw blade 8 at all times in response to the angular displacement of the blade 8. The shutter 17 is thus effective to close the blade clearance gap 16 at any working angle of the saw blade 8, assuring a passage for the lowering blade 8 at all times.

Now, the operation of the device thus constructed is as follows. In this embodiment, the shutter 17 for closing the blade clearance gap 16 of the guide fence 14 has integrally formed a pair of shutter plates 18 and an interlocking piece 19. The shutter plates 18 are longitudinally aligned with the blade entering opening 20 formed therebetween and defining the passage of the saw blade 8 when lowered. The shutter plates 18 are mounted on the guide fence 14 in the vicinity of the blade clearance gap 16 for horizontal sliding movement in the direction of the work engaging surface 15. The interlocking piece 19 is interlocked for displacement with the turntable 2, so that it can convert the rotational movement of the turntable 2 into linear movement of the shutter plates 18. Thus, the shutter plates 18 are horizontally moved to displace the blade entering opening 20 directly below the saw blade 8 at all times in response to the angular displacement of the saw blade 8.

When the turntable 2 is turned along with the saw blade 8 in order to change the cutting angle with respect to the workpiece, the shutter plates 18 are automatically moved horizontally along the work engaging surfaces 15 through the interlocking piece 19 operatively associated with the turntable 2. At the same time that this occurs, the blade entering opening 20 is displaced directly below the saw blade 8 in response to the angular displacement of the blade 8, so that the blade clearance gap 16 can be effectively closed by the shutter plates 18, while providing the passage of the saw blade 8 at all times.

Thus, it can be seen that the present invention is effective to prevent the trouble of hindering the cutting operation caused by chips intruding through the gap 16 into, for example, the spacing between the blade guard 10 and the saw blade 8 during the descend of the saw blade 8. Also, it can be appreciated that the present invention is effective to simplify the mechanism for shutting off the passage of chips.

Especially, as the shutter plates 18 are small pieces of a configuration divided from the guide fence 14 and serving as parts of the work engaging surfaces 15, the shutter mechanism may be compact and lightweight. Therefore, the force required to move the shutter 17 may be reduced, permitting smooth and effective movement of the shutter 17, and the guiding operation around the cutting region of the workpiece may be improved.

Though, in the foregoing embodiment, a pair of shutter plates 18 are longitudinally aligned to shut the blade clearance gap 16 on both sides of the passage of the saw blade 8, the shutter may have only one shutter plate 18 for shutting only one side of the blade clearance gap 16 where chips are cut.

While the invention has been described with reference to a preferred embodiment thereof, it is to be understood that modifications or variations may be easily made without departing from the spirit of this invention which is defined by the appended claims.

What is claimed is:

1. A portable miter saw of the type driven by an electric motor, comprising:

a supporting base;

a horizontal turntable mounted for selective rotatable movement on said supporting base;

a support arm having a lower end fixedly connected with one peripheral portion of said turntable and an upper end adapted to move along a vertical path relative to said turntable;

a saw blade rotatably carried on said upper end of said support arm generally above said turntable;

a guide fence mounted on said base and including a pair of work engaging surfaces longitudinally aligned across a blade clearance gap formed therebetween to provide passage of said saw blade; and shutter means operatively connected to said turntable for shutting said blade clearance gap and slidable on said guide fence upon rotation of said turntable to selectively change the cutting angle of said saw blade.

2. The portable miter saw as defined in claim 1 wherein said shutter means includes:

a pair of shutter plates longitudinally aligned across a blade entering opening formed therebetween so as to shut said blade clearance gap on both sides of the passage of said saw blade; and an interlocking piece connected to said pair of shutter plates generally below said blade entering opening and movable in operative association with said turntable so as to linearly displace said shutter plates in response to angular displacement of said saw blade.

3. The portable miter saw as defined in claim 2 wherein said turntable includes a kerf board mounted thereon and having a cutting channel defining the passage of said saw blade and an oblong opening for receiving said interlocking piece therein, said oblong opening being disposed at a position eccentric from the axis of rotation of said turntable, and said interlocking piece being slidably fitted in said oblong opening.

4. The portable miter saw as defined in claim 3 wherein said kerf board is made of plastic material.

5. The portable miter saw as defined in claim 2 wherein said pair of shutter plates and said interlocking piece are integrally formed of plastic material.

6. The portable miter saw as defined in claim 2 wherein each of said shutter plates has a shutter surface aligned with the work engaging surfaces of said guide fence.

7. The portable miter saw as defined in claim 1 wherein said shutter means includes at least one shutter plate for shutting at least one side of said blade clearance gap divided into two parts by the passage of said saw blade.

* * * * *